United States Patent
Cantrell et al.

(10) Patent No.: US 7,623,063 B2
(45) Date of Patent: Nov. 24, 2009

(54) SYSTEM FOR SIMULTANEOUSLY TRANSMITTING MULTIPLE SIGNALS THROUGH EACH ELEMENT OF A RADAR ARRAY

(75) Inventors: Ben Cantrell, Springfield, VA (US); Ching Tai-Lin, Burke, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 300 days.

(21) Appl. No.: 11/850,065

(22) Filed: Sep. 5, 2007

(65) Prior Publication Data
US 2009/0256738 A1    Oct. 15, 2009

Related U.S. Application Data

(62) Division of application No. 10/911,537, filed on Aug. 2, 2004, now abandoned.

(51) Int. Cl.
*G01S 13/00* (2006.01)

(52) U.S. Cl. .................. 342/175; 342/13; 342/25 R
(58) Field of Classification Search .............. 342/13, 342/14, 15, 16, 25 R, 36, 41, 368, 371, 372
See application file for complete search history.

(56) References Cited

U.S. PATENT DOCUMENTS

| 4,721,960 | A | * | 1/1988 | Lait ......................... 342/368 |
| 5,150,336 | A | * | 9/1992 | Sullivan et al. ............. 367/103 |
| 5,160,936 | A | | 11/1992 | Braun et al. |
| 5,940,029 | A | | 8/1999 | Ninomiya et al. |
| 6,008,755 | A | | 12/1999 | Ishikawa et al. |
| 6,856,284 | B1 | * | 2/2005 | Cangiani .................... 342/372 |
| 2002/0003502 | A1 | | 1/2002 | Falk |
| 2003/0095068 | A1 | * | 5/2003 | Purdy et al. ................. 342/377 |

FOREIGN PATENT DOCUMENTS

WO    WO 9702496 A1    1/1997

OTHER PUBLICATIONS

P.K. Hughes and J.Y. Choe, "Overview of Advanced Multifunction RF System (AMRFS)," Proceedings of the 2000 IEEE International Conference, May 2000.

(Continued)

*Primary Examiner*—Isam Alsomiri
(74) *Attorney, Agent, or Firm*—John J. Karasek; L. George Legg (57) ABSTRACT

In conventional phased array antennas, multiple signals that perform different functions, such as radar, electronic warfare (EW) and telecommunications, can each be simultaneously transmitted only through a different sub-aperture of the array. For maximum power and efficiency in conventional phased array antennas, the power amplifiers operate on one signal at a time. The present invention forms a common waveform from multiple signals for transmission through a common aperture of a phased array antenna. In wideband operations, waveform-shaping and amplitude-to-phase-modulation are used to transmit high-power diverse waveforms through every element of the array.

6 Claims, 12 Drawing Sheets

OTHER PUBLICATIONS

W.M. Waters and B.R. Jarrett, "Bandpass Signal Sampling and Coherent Detection," NRL Report 8520, Dec. 1981.

Chirex, H., "High Power Outphasing Modulation," Proc. IRE, vol. 23, No. 11, Nov. 1935.

Hemmi et al. "Multifuctional Wide-Band Array Design," IEEE Transactions on Antennas and Propagation, vol. 47, No. 3, pp. 425-431, Mar. 1999.

N. Fourikis, "Novel Shared-Aperture Phased Arrays", Microwave and Optical Technology Letters, vol. 17, No. 3, pp. 189-192, Feb. 20, 1998.

Axness et al. "Shared Aperture Technology Development", John Hopkins APL Technical Digest, vol. 17, No. 3, pp. 285-293, 1996.

Pozar et al, "A Shared-Aperture Dual-Band Dual-Polarized Microstrip Array," IEEE Transaction on antennas and propagation, vol. 49, No. 2, pp. 150-157, Feb. 2001.

\* cited by examiner

SYSTEM FOR SIMULTANEOUSLY TRANSMITTING MULTIPLE SIGNALS THROUGH EACH ELEMENT OF A RADAR ARRAY

The present application is a divisional of U.S. Ser. No. 10/911,537, entitled "SIMULTANEOUS TRANSMISSION OF MULTIPLE SIGNALS THROUGH A COMMON SHARED APERTURE", filed Aug. 2, 2004.

BACKGROUND OF THE INVENTION

1. Field of the Invention

In phased array antennas, multiple signals (such as radar, electronic warfare (EW), and communications waveforms) can each be simultaneously transmitted only through a different sub-aperture of the array. For maximum power and efficiency, the power amplifiers operate on one signal at a time. This invention is to form multiple signals as a common waveform and transmit them through a common shared array aperture. The user signals are thus transmitted simultaneously and independently with full antenna gain in any direction.

2. Description of the Related Prior Art

The number of electronic equipments and associated antennas carried on military platforms continues to grow rapidly. In many instances, the platforms can no longer properly carry, nor operate, all the desired electronic equipment. To alleviate this problem, a significant initiative called the Advanced Multi-Function Radio-Frequency Aperture Concept (AMRFC) was undertaken by the Office of Naval Research (ONR) and Naval Research Laboratory (NRL), and is discussed in P. K. Hughes and J. Y. Choe, "Overview of Advanced Multifunction RF System (AMRFS)," Proceedings of the 2000 IEEE International Conference on Phased Array Systems and Technology, May 2000. The AMRFC objective is to provide many military electronic services for communications, radar, and electronic warfare (EW) by means of shared electronic equipment and through the use of a common antenna.

Currently, if multiple signals, such as radar and EW, are to be simultaneously transmitted in time, each individual signal is transmitted through a different sub-aperture of the antenna such that any power amplifier in the array only operates on one signal at a time. The sub-aperture that transmits each signal is dynamically allocated. It is necessary to transmit one signal at a time through a power amplifier since the power amplifiers operate at saturation for maximum power and efficiency. If two signals are simultaneously present at the power amplifier input, the resulting output signal will generally be highly distorted and contain extremely high intermodulations, thus causing serious problems for the nearby receiving antenna. Alternately, if the amplifier is operated in a linear mode, significant power and efficiency are lost. Consequently, at the present time only one type of signal at a time is distributed to each sub-aperture. As a result, the full gain of the antenna cannot be realized on any of the user signals that are required for simultaneous transmission.

Clearly, to form and transmit a noise-like combined waveform without mutual interaction, the signals' spectra must be well confined and located anywhere within the available frequency band, as long as they do not overlap. However, sharply confining the spectra requires signal shaping in the time domain that causes amplitude modulation of the waveforms, as discussed in W. M. Waters and B. R. Jarrett, "Bandpass Signal Sampling and Coherent Detection," NRL Report 8520, December 1981. It is desirable to pass these combined spectrally clean, amplitude-varying waveforms through conventional power amplifiers that are operated near their full-rated RF power levels for greater efficiency. Since the power amplifiers exhibit nonlinear operation, the combined amplitude-varying input signals need to be converted into signals of constant amplitude before being transformed back to a diverse high power signal.

Here a new technique along with its practical implementation is invented, which provides a transformation on the sum of multiple signals through the Chirex outphasing, as discussed in Chirex, H., "High Power Outphasing Modulation," Proc. IRE, Vol. 23, No. 11, November 1935, prior to power amplification, and an inverse transformation of the combined signal through power amplification. This technique allows simultaneous transmission of multiple signals through every saturated power amplifier in the array antenna without serious intermodulations and spectral distortion. In the case that these multiple signals are radar and EW waveforms, the radar waveform cannot degrade the effectiveness of the Electronic Attack (EA) technique, and similarly the EA technique cannot interfere with the radar's target-detection function. Since the individual signals of this combined waveform are spectrally confined and can be hopped about the common portion of the available frequency bands, all Navy platforms such as ships and decoys could use this waveform to prevent Electronics Surveillance (ES) systems from distinguishing between them. Transmission of this diverse waveform can deny antiradiation missiles (ARMs) from acquiring and targeting Navy platforms. On the other hand, Navy ships can target hostile platforms without being targeted themselves.

SUMMARY OF THE INVENTION

In this invention, a diverse waveform is formed from multiple signals and transmitted through a common array aperture. The invention provides a new technique that provides a transformation that shapes and combines multiple signals prior to power amplification and an inverse transformation that converts the transformed phase-modulated (PM) signals back into a high-power, low-distortion, amplitude-varying waveform. This technique allows simultaneous transmission of multiple signals through every saturated power amplifier in the array antenna without serious intermodulations and spectral distortion. To implement this technique in wideband operations, innovative amplitude-to-phase-modulation (AM-PM) processes in associated with the inverse transformations capable of transmitting combined waveforms are devised.

DETAILED DESCRIPTION OF THE INVENTION

Figure 1:
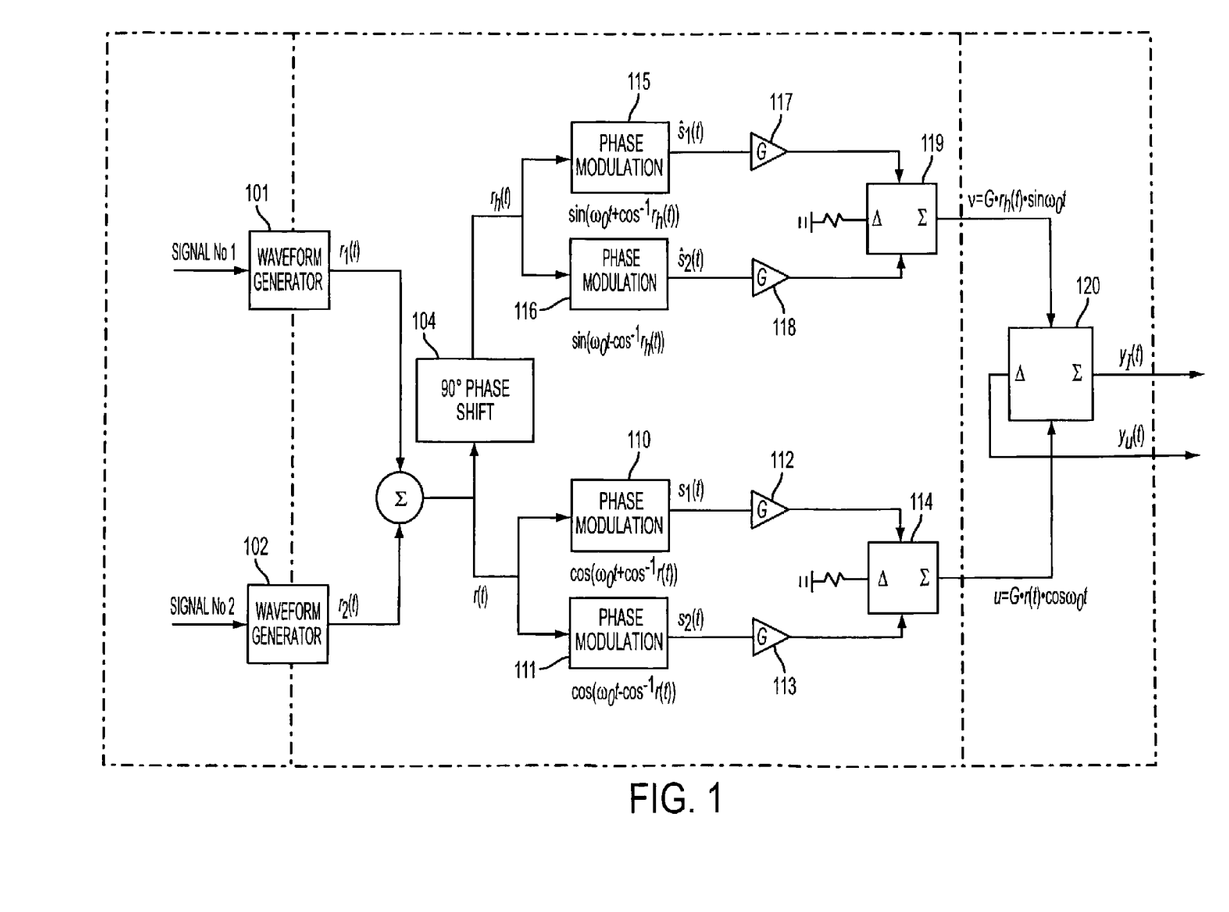
FIG. 1 illustrates transmission of multiple signals with the signals combining before power amplifiers.
Figure 2:
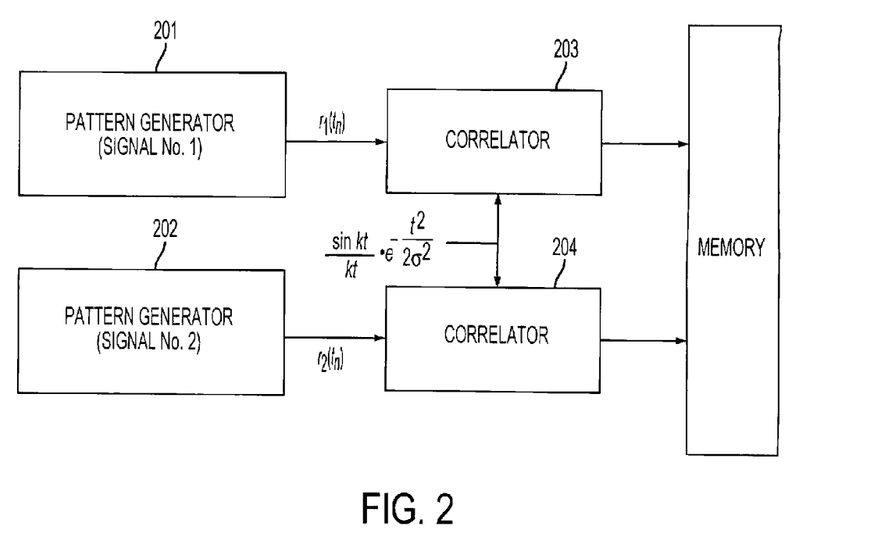
FIG. 2 illustrates generation of clean-spectrum signals.
Figure 3:
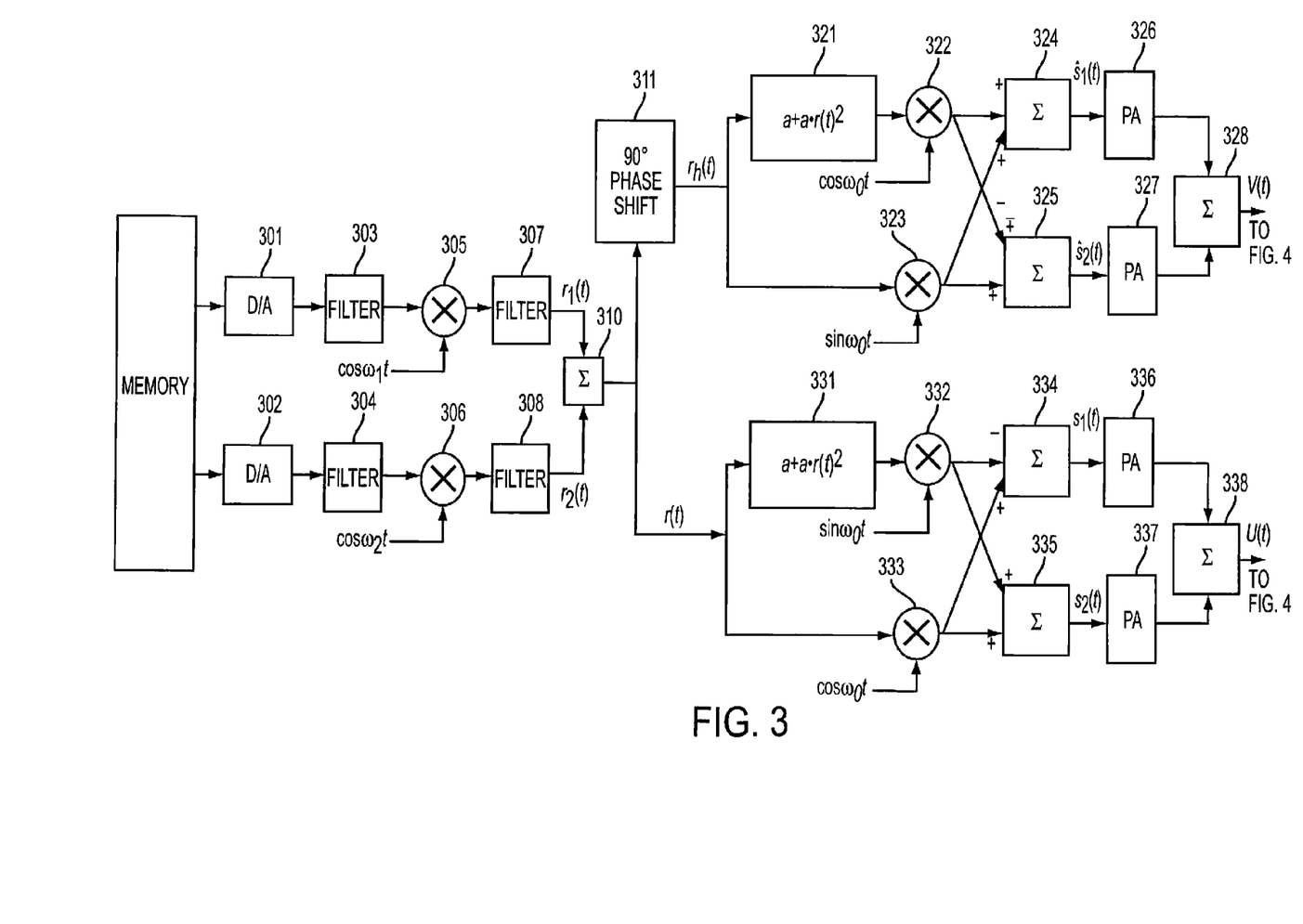
FIG. 3 illustrates implementation for simultaneous transmission of multiple signals (double sideband circuitry).
Figure 4:
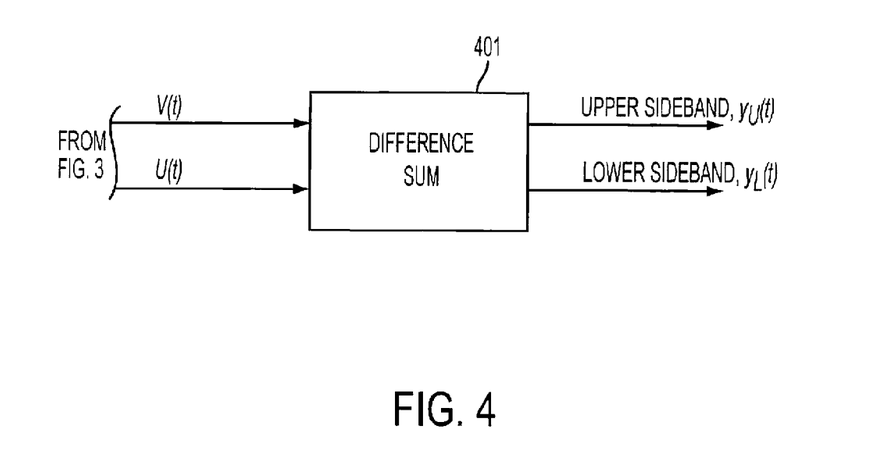
FIG. 4 illustrates formation of a single sideband diverse waveform.

The detailed description of the invention closely follows the block diagrams and figures shown in FIGS. 1 through 12. FIG. 1 is the overall block diagram describing the new technique in transmitting a high power diverse waveform without serious intermodulations and spectral distortion. FIGS. 2 through 4, which are sub-blocks of FIG. 1, detail the practical implementation. FIGS. 5 through 11 are the signal outputs, appearing in time or frequency domains, for some critical blocks shown in FIG. 3

Transmission of Multiple Signals With the Signals Combining Before Power Amplifiers—FIG. 1

FIG. 1 is the overall block diagram describing the new technique in transmitting a high power diverse waveform without serious intermodulations and spectral distortion.

Clean-spectrum signals $r_1(t)$ and $r_2(t)$ are generated through the waveform generators 101 and 102 in that desired waveforms are generated and passed through the correlators and Digital to Analog converters (DAC). Signals $r_1(t)$ and $r_2(t)$, which are time-continuous and band-limited, can be summed to form a spectrally confined waveform r(t), i.e., $r(t)=r_1(t)+r_2(t)$. It has to be pointed out that the above two signals $r_1(t)$ and $r_2(t)$ can be transmitted coincidently and independently. The signals need not be aligned with each other for combining and transmission. Diverse signal r(t) is then up-converted through power amplifiers that would operate in saturation at their full-rated RF power. Clearly r(t) varies widely in magnitude and cannot be transmitted through power amplifiers without distortion since the power amplifiers operate in saturation at their full-rated RF power. The Chirex outphasing principle is used to transform r(t) into phase modulated (PM) signals of opposite phase in two separate channels as processed in phase modulators 110 and 111. Here the signals out of phase modulators 110 and 111 are:

$$s_1(t)=\cos(\omega_0 t+\cos^{-1} r(t))$$

and $$s_2(t)=\cos(\omega_0 t-\cos^{-1} r(t)).$$

respectively, where $\omega_0$ is the carrier frequency. It can be seen that constant amplitudes are maintained in the above modulation processes.

In adder 114, the encoded signals $s_1(t)$ and $s_2(t)$ are added through power amplifiers to form a high-power, low-distortion, amplitude-varying waveform, $$u(t) \equiv G \cdot (s_1(t)+s_2(t))=2 \cdot G \cdot r(t) \cdot \cos\omega_0 t,$$

where G is the power amplifier gain, r(t) is the modulating signal, and $\omega_0$ is the up-converted frequency. Here, the up-converted high-power signal u(t) is double sidebanded. Since both sidebands contain identical information, it is sufficed to transmit either sideband of the combined signal. To obtain either the upper or the lower sideband of this signal, we have to combine u(t) with an analogous signal v(t) through a combiner 120. Here r(t) is processed through phase shifter 104, phase modulator 115, phase modulator 116, power amplifier 117, power amplifier 118 and adder 119 to generate v(t) in that r(t) is 90° phase-shifted and transformed through a modified Chirex outphasing process. Phase modulators 115 and 116 actually perform the following functions:

$$\hat{s}_1(t)=\sin(\omega_0 t+\cos^{-1} r_h(t))$$

and $$\hat{s}_2(t)=\sin(\omega_0 t-\cos^{-1} r_h(t)).$$

In the above, $r_h(t)$ is the quadrature function of r(t). Clearly $r_h(t)$ is the Hilbert transform of r(t) in that the phase of r(t) is shifted by $-\pi/2$ for positive frequencies and $\pi/2$ for negative frequencies. The signal v(t), corresponding to u(t), is obtained by summing $\hat{s}_1(t)$ and $\hat{s}_2(t)$ after passing through the power amplifiers 117 and 118, $$v(t) \equiv G \cdot (\hat{s}_1(t)+\hat{s}_2(t))=2 \cdot G \cdot r_h(t) \cdot \sin(\omega_0 t).$$

Since the upper sideband high-power signal is defined and given by $$y_U = \mathrm{Re}\{r(t)+jr_h(t)\}e^{j\omega_0 t},$$

we obtain $$y_U = r(t)\cos\omega_0 t - r_h(t)\sin\omega_0 t,$$

or, $$y_U = K \cdot (u(t)-v(t))$$

(where K is a constant) since $u(t)=2 \cdot G \cdot r(t)\cos\omega_0 t$ and $v(t)=2 \cdot G \cdot r_h(t)\sin\omega_0 t$ as obtained in adders 114 and 119. Similarly we can show that the lower sideband signal $y_L$ is the sum of u(t) and v(t) and $y_L = K \cdot (u(t)+v(t))$.

The configuration shown in FIG. 1 provides a transformation that shapes and combines multiple signals prior to power amplification and an inverse transformation that converts the transformed PM signals back into a high-power, low-distortion, amplitude-varying waveform. Either the double sideband signal u(t) or the single sideband signal $y_U$ or $y_L$ can be transmitted out of every element of a common shared aperture. This technique allows simultaneous transmission of multiple signals through every saturated power amplifier in the array antenna without serious intermodulations and spectral distortion.

Generation of Clean-spectrum—FIG. 2

It is our objective to transmit a noise-like, combined waveform through a common shared aperture with little distortion. Therefore, the individual signals to be combined and transmitted must be shaped such that their spectra are bandpass limited. These so-called clean-spectrum signals can be obtained through interpolation, which includes the correlation process performed by correlators 203 and 204, and conversion of the sampled signals to analog by means of digital-to-analog converters or DACs.

From the basic theory involving sampling of a band-limited signal, the following interpolation function can be derived if the signal is to be limited to one-side bandwidth W:

$$h(t)=[\sin(2\pi m W t)-\sin(2\pi(m-1)Wt)]/2\pi W t,$$

where m is an integer. Clearly, at baseband m=1, $$h(t)=\sin(2\pi W t)/(2\pi W t).$$

Let $r_{1,2}(t_n)$ be the time series samples of the user waveforms. Then the shaped signals become $$r_{1,2}(t)=\Sigma r_{1,2}(t_n) \cdot h(t-t_n) \cdot w(t-t_n),$$

where w(t) is a weight function. Indeed the signals $r_{1,2}(t_n)$ are spectrally confined from —mW to -(m−1) W and from (m−1) W to mW. The interpolation or sampling rate is 1/(2W). Generally, the signal bandwidth B is less than or equal to W. For summation in finite length, the clean spectrum or smoothed signal may still be properly band-limited if a weighting factor is included in the interpolation function h(t) described above. Here h(t) is simply weighted with a Gaussian function, $$w(t)=(\sin kt/kt)\cdot e \exp(-^2/2\sigma^2).$$

In pattern generators 201 and 202, desired waveforms $r_1(t_n)$ and $r_2(t_n)$ are generated. These waveforms are then passed through correlators 203 and 204 to generate digital clean-spectrum data and store in the computer memory.

Implementation for Simultaneous Transmission of Multiple Signals (Double Sideband Circuitry)—FIG. 3

FIG. 1 illustrates a configuration of the transformation that encodes the combined signals r(t) into signals of constant amplitudes prior to power amplification and an inverse transformation that converts the transformed PM signals back into a high-power amplitude-varying waveform u(t) or v(t). All these function blocks are realized in FIG. 3 with the circuitry implemented for wideband array operation.

It may not be practical to form the analog PM signals from a carrier modulated by $\pm\cos^{-1} r(t)$, as configured in phase modulators 110, 111, 115 and 116 in FIG. 1, when wide bandwidth signals are required. For practical implementation, the PM signal output from phase modulator 110

$$s_r(t)=\cos(\omega_0 t+\cos^{-1} r(t))$$

is considered in a different form. Since $$\cos^{-1} r(t)|\tan^{-1}((1-r(t)^2)^{1/2} r(t)),$$

this PM signal becomes $$s_r(t)=r(t)\cdot\cos\omega_0 t-(1-r(t)^2)\cdot\sin\omega_0 t.$$

By a simple series expansion or a polynomial fit to the above square-root term, the signal can be practically approximated as $$s_1(t)\approx r(t)\cdot\cos\omega_0 t-(a+b\cdot r(t)^2)\cdot\sin\omega_0 t,$$

where a and b are constants. The circuitry composed of Blks 331, 332, 333 and 334 accomplishes the above function. Similarly, the PM signal for the process of $\cos(\omega_0 t-\cos^{-1} r(t))$ can be obtained through the Blks 331, 332, 333 and 335.

In FIG. 3, practical 14-bit DACs 301 and 302 are used to convert the output data from FIG. 2 into analog. These signals are up-converted to an intermediate frequency (IF) via filter 303, mixer 305 and filter 307 and via filter 304, mixer 306 and filter 308, respectively and are then combined as r(t) in adder 310. Next, the combined signal r(t) is encoded into four signals $s_1(t)$, $s_2(t)$, $\hat{s}_1(t)$ and $\hat{s}_2(t)$ through Blks 334, 335, 324 and 325. respectively. These encoded signals are all nearly constant amplitudes. The Chirex outphasing process for the upper two channels (Blks 321 through 325) is modified such that the corresponding functions $\sin(\omega_0 t\pm\cos^{-1} r_h(t))$, instead of $\cos(\omega_0 t\pm\cos^{-1} r(t))$, are performed. Here $r_h(t)$ is the input with r(t) being 90° phase shifted (Blk 311). The above four signals are next passed through four saturated power amplifiers. The sum of these signal outputs from the lower two channels and from the upper two channels are then formed, indicated here as u(t) and v(t), respectively. It is pointed out that both u(t) and v(t) generated in FIG. 3 are high-power, low-distortion, amplitude-varying waveforms. Both signals are double sidebanded.

Formation of a Single-sideband Diverse Waveform—FIG. 4

The double-sidebanded signals u(t) and v(t), obtained by combining the lower two channels and upper two channels in FIG. 3, are then summed or subtracted through a combiner 401 to obtain either the lower sideband $y_L(t)$ or the upper sideband $y_U(t)$ of the up-converted high-power signal.

This implementation is based on the algorithms that the upper sideband of the combined signal r(t) is given by $y_U$=Re $(\{r(t)+j\ r_h(t)\} \exp.(j\omega_0 t)$, or equivalently $y_U=r(t) \cos \omega_0 t - r_h(t) \sin \omega_0 t$, where r(t) and $r_h(t)$ are defined in FIG. 3. Consequently $y_U = K \cdot (u(t)-v(t))$, since $u(t)=2\cdot G\cdot r(t)\cdot\cos \omega_0 t$ and $v(t)=2\cdot G\cdot r_h(t)\cdot\sin \omega_0 t$. Similarly, $y_L =r(t) \cos \omega_0 t+r_h(t) \sin \omega_0 t=K\cdot(u+v)$. Here we consider $\omega_1=25$ MHz, $\omega_{22}=60$ Mhz and $\omega_0=730$ MHz in the frequency up-conversion process.

Figure 5:
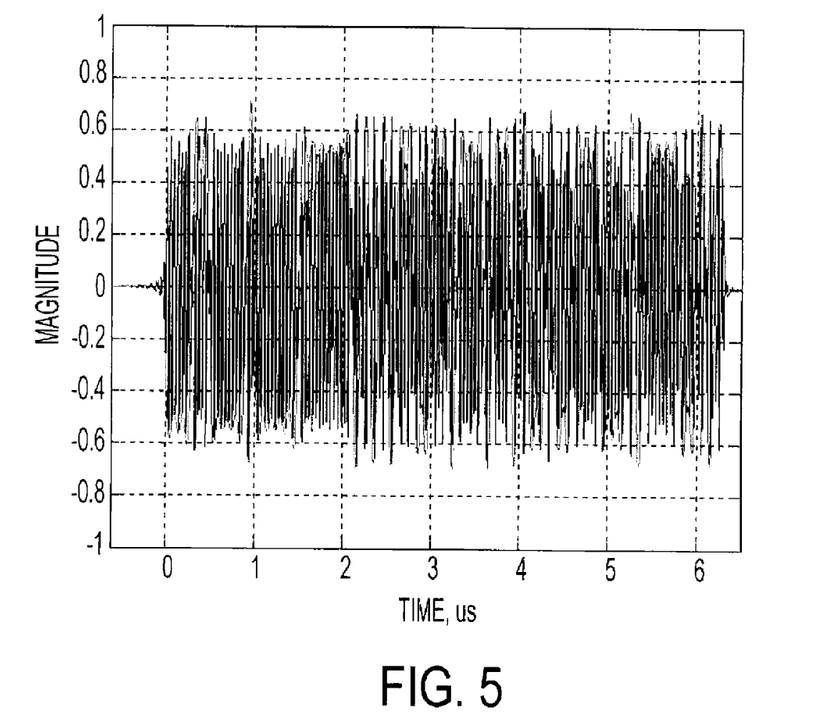
FIG. 5 illustrates shaped and spectrally confined signal no. 1, $r_1(t)$.

Shaped and Spectrally Confined Signal No. 1, $r_1(t)$—FIG. 5

This is the spectrally confined signal $r_1(t)$ output from waveform generator 101 in FIG. 1 or from filter 307 in FIG. 3. Pattern generator 201 generates the 63-element maximum-length shift-register pseudorandom code $r_1(t_n)$, which is smoothed up through interpolation and converted to analog. The signal is centered at 25 MHz and spectrally confined from 15 to 35 MHz.

Figure 6:
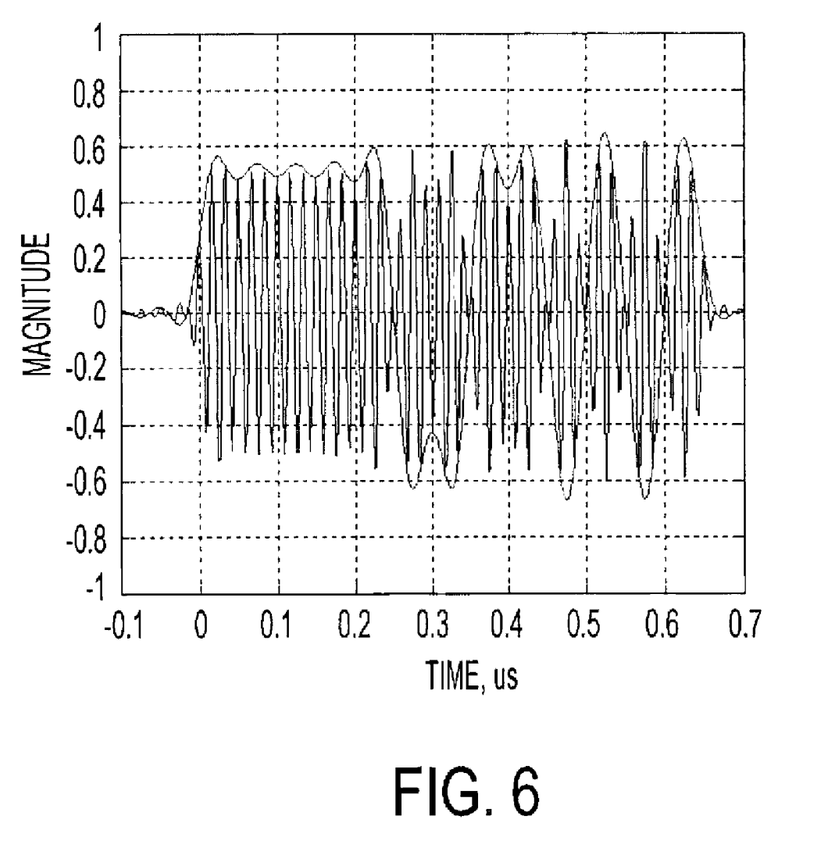
FIG. 6 illustrates shaped and spectrally confined signal no. 2, $r_2(t)$.

Shaped and Spectrally Confined Signal No. 2, $r_2(t)$—FIG. 6

This is the spectrally confined signal $r_2(t)$ out of waveform generator 102 in FIG. 1 or out of filter 308 in FIG. 3. Pattern generator 202 generates the 13-element Barker code $r_2(t_n)$, which is then smoothed up through interpolation and converted to analog. The signal is centered at 60 MHz and spectrally confined from 40 to 80 MHz.

Figure 7:
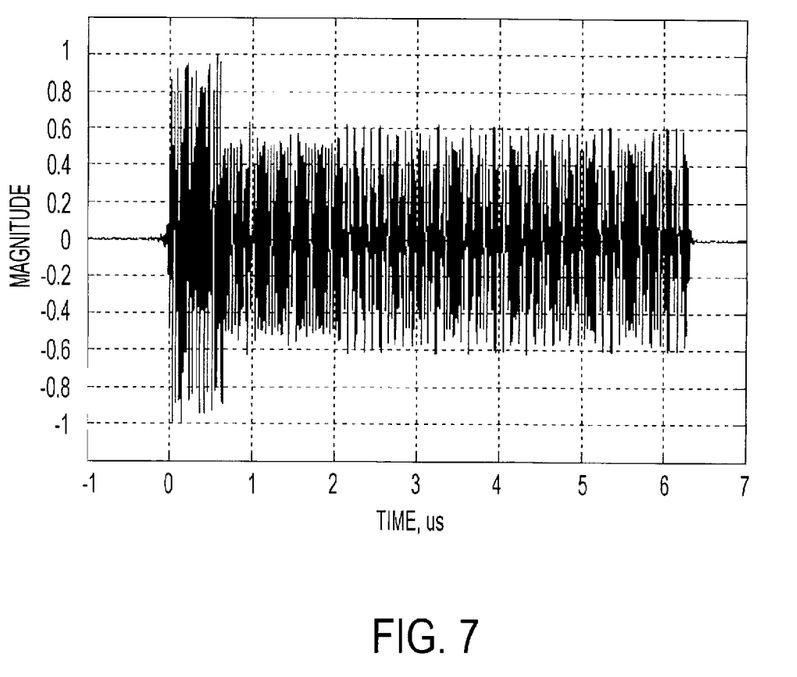
FIG. 7 illustrates a spectrally diverse waveform r(t) by combining $r_1(t)$ and $r_2(t)$.

A Diverse Combined Signal r(t) by combining $r_1(t)$ and $r_2(t)$—FIG. 7

The spectrally confined waveforms $r_1(t)$ and $r_2(t)$, which are time-continuous and band-limited, are summed in adder 310 to form a diverse waveform r(t). It is pointed out that the above two signals can be transmitted coincidently and independently. The signals need not be aligned with each other for combining and transmission.

Figure 8:
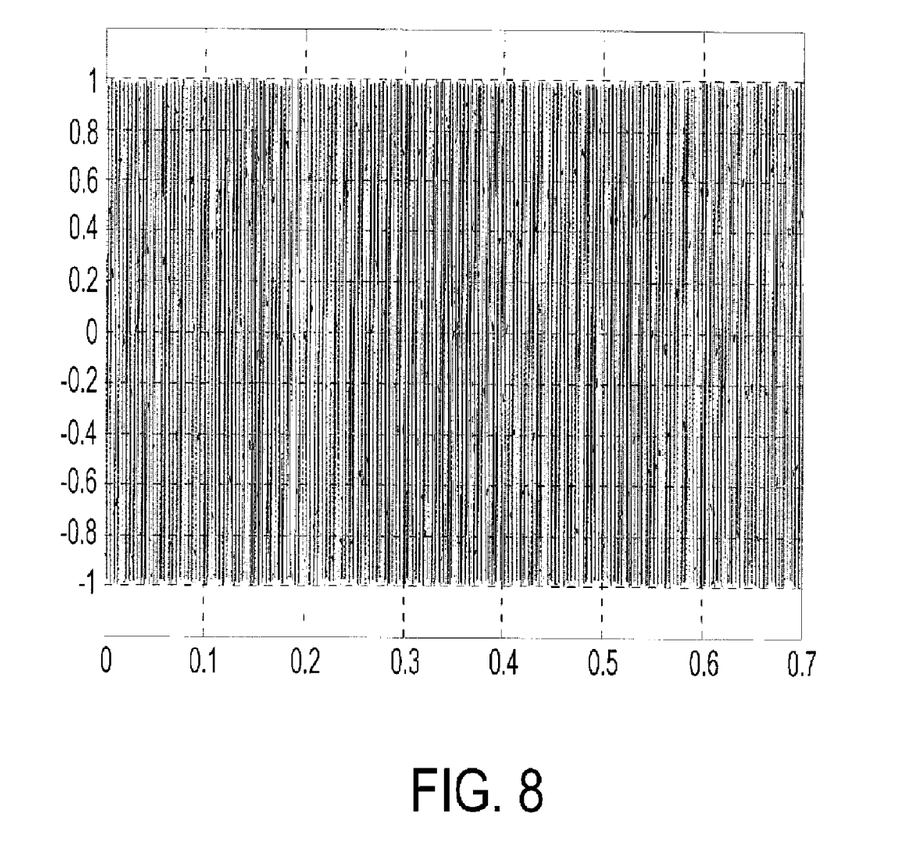
FIG. 8 illustrates an up-converted signal after AM-PM conversion for the bottom channel.

Up-Converted Signal After AM-PM Conversion for the Bottom Channel at adder 335—FIG. 8

This is one of the decoded signals transformed from the amplitude-varying combined signal r(t) through the processor 331, mixer 332, adder 333 and power amplifier 335. This signal $s_2(t)$ output from adder 335 is up-converted to 730 MHz and maintains nearly constant amplitude.

Figure 9:
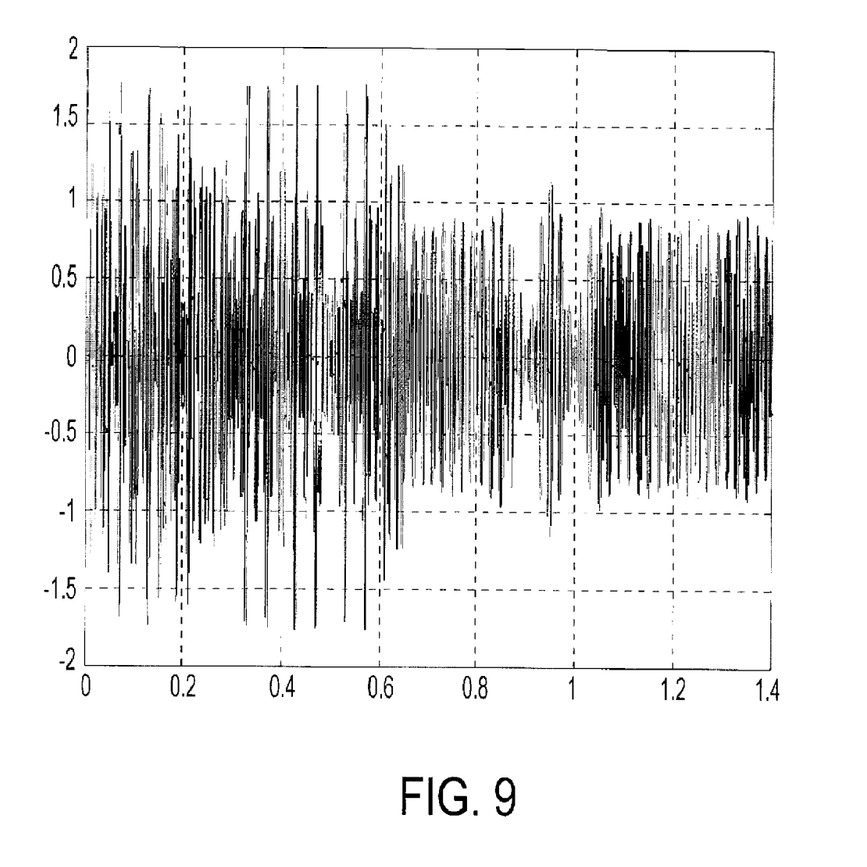
FIG. 9 illustrates an output signal in time after Chirex outphasing for the double sideband signal.

Output Signal In Time After Chirex Outphasing for the Double Sideband Signal at adder 338—FIG. 9

This is the signal out of the reconfigured Chirex outphasing by summing two encoded signals input to adder 338. This signal showing in time domain is double sidebanded with the carrier $\omega_0$ set at 730 MHz. The summation process converts the transformed PM signals back into a high-power, low-distortion, amplitude-varying waveform.

Figure 10:
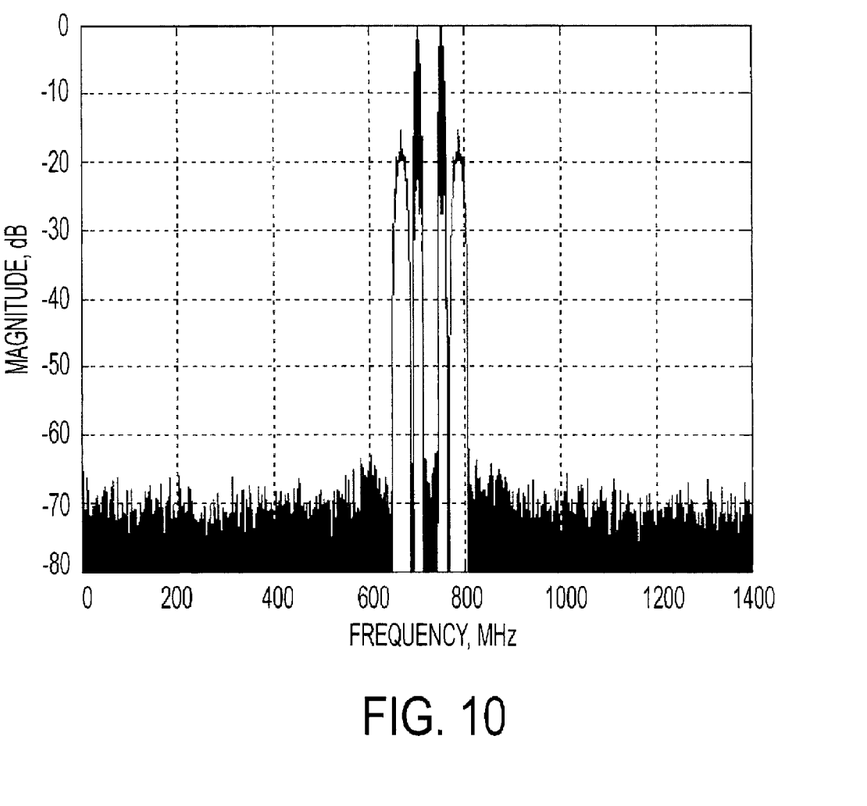
FIG. 10 illustrates an output signal in frequency after Chirex outphasing for the double sideband signal.

Output Signal In Frequency After Chirex Outphasing for the Double Sideband Signal at adder 338—FIG. 10

The same signal in FIG. 9 is shown here in frequency domain. This is the signal out of the reconfigured Chirex outphasing by summing two encoded signals input to adder 338. This signal showing in frequency domain is double sidebanded with the carrier $\omega_0$ set at 730 MHz.

Figure 11:
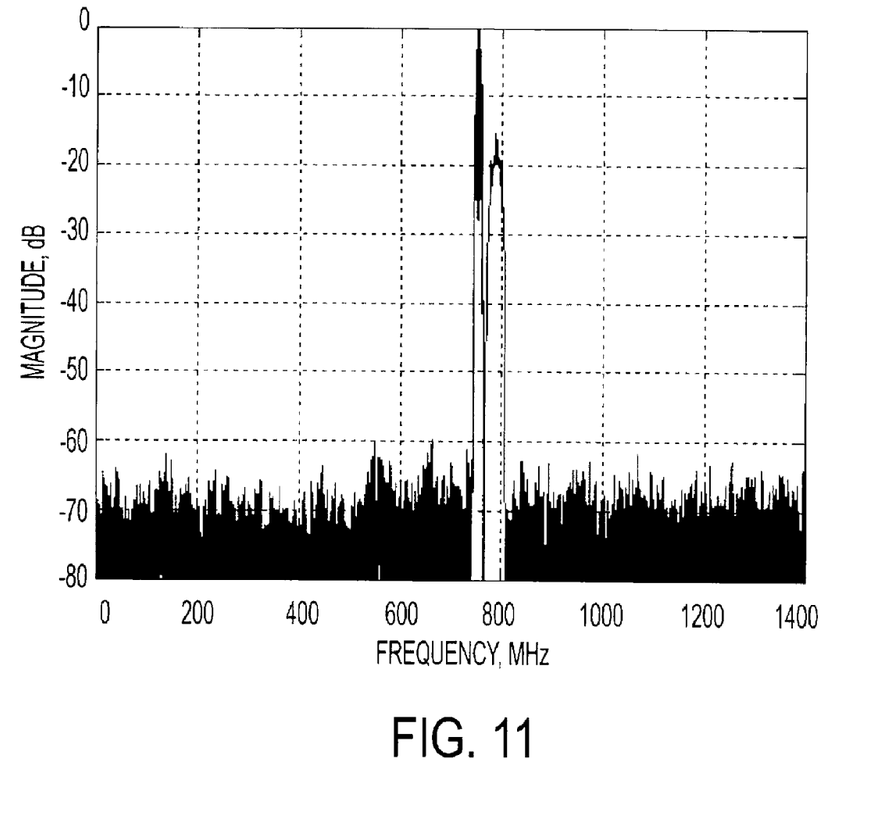
FIG. 11 illustrates the upper sideband high-power low-distortion combined signal out of the difference channel of a combiner.

The Upper Sideband High-Power Low-Distortion Combined Signal Out of the Difference Channel of Combiner 401—FIG. 11

Since both sidebands of the transformed back high power signals, u(t) and v(t), contain identical information, it is sufficient to transmit either sideband of the combined signal. The upper sideband of this high-power, low-distortion, amplitude-varying signal is attained through the difference channel of the combiner combiner 401.

Figure 12:
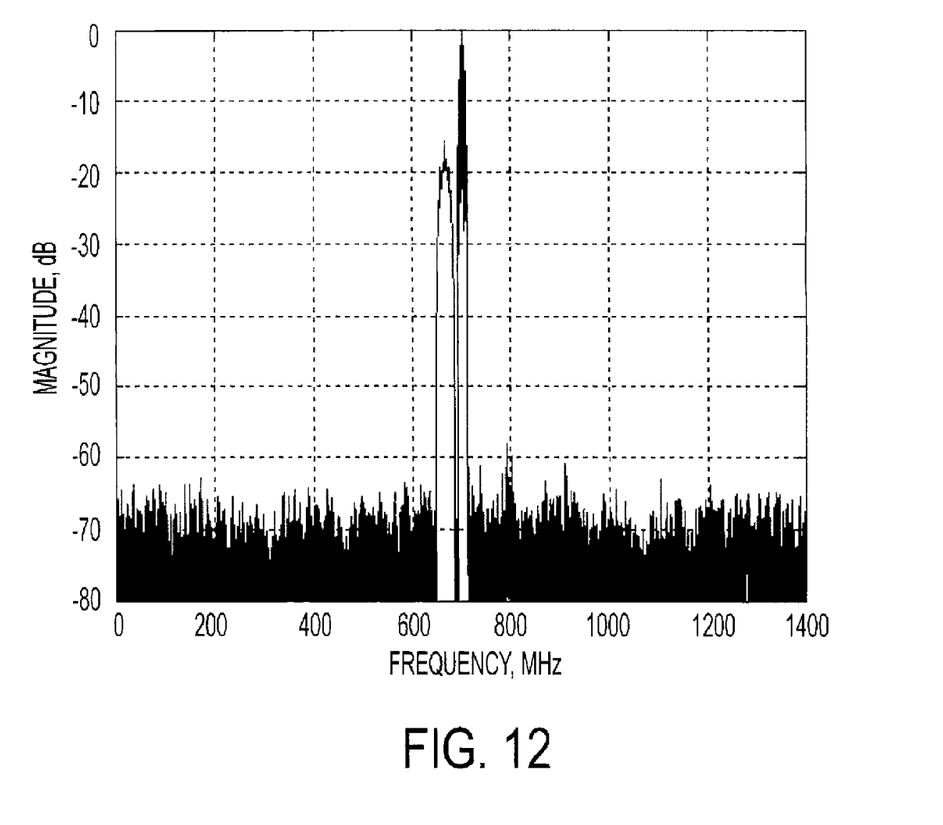
FIG. 12 illustrates the lower sideband high-power low-distortion combined signal out of the sum channel of the combiner.

The Lower Sideband High-Power Low-Distortion Combined Signal Out of the Sum Channel of the Combiner combiner 401—FIG. 12

The lower sideband of the high-power, low-distortion, amplitude-varying waveform is attained through the sum channel of the combiner 401. This converted common signal combined from multiple signals can thus transmitted out of every element of the array.

SUMMARY

Multiple signals are combined to form a common waveform and are then transmitted through a common aperture composed of array modules. Specifically, a combined EW/radar waveform that applies an electronic attack (EA) technique and performs a radar function can be applied here. As a result, the full aperture gain can be realized on both EW and radar signals when they are simultaneously transmitted. If the beam-steering time delay is applied to each signal before combining, the signal can be coincidently and independently transmitted at different angles. Since the spectrally interlaced combined signal can be potentially noise-like, Navy platforms that use these common waveforms would be difficult to discriminate. Both EA and radar functions can be performed simultaneously without degradation and interference.

A technique that provides a transformation that shapes and combines signals prior to power amplification and an inverse transformation that converts the phased-modulated signals back into a high-power, low-distortion, amplitude-varying waveform is described. This technique allows simultaneous transmission of multiple signals through every saturated power amplifier in the array antenna without serious intermodulations and spectral distortion. To implement this technique in wideband operations, the present invention provides an innovative amplitude-to-phase-modulation process in associated with the inverse transformation capable of generating and transmitting either the double-sidebanded or single-sidebanded combined signal.

What is claimed is:

1. A radar antenna system for use with a first input signal generator operable to generate a first input signal and a second input signal generator operable to generate a second input signal, said system comprising:

a radar array of radiating elements;

signal processing system for use the a first input signal generator, the second input signal generator and said array of radiating elements, each element of which is operable to receive a respective provided signal and emit an emitted signal based on the provided signal, said signal processing system being operable to combine the first input signal and the second input signal into a combined signal; and an output portion disposed to receive the combined signal from said signal processing portion and operable to provide an output signal based on the combined signal to each of the radiating elements such that each of the radiating elements emits an emitted signal based on the provided output signal.

2. The radar antenna system of claim 1, wherein said signal processing portion comprises a transformation portion operable to transform the combined signal and to provide the transformed combined signal to said output portion.

3. The radar antenna system of claim 2, wherein said transformation portion is operable to transform the combined signal using a Chirex outphasing principle.

4. A radar antenna system comprising:

a first input signal generator operable to generate a first input signal;

a second input signal generator operable to generate a second input signal;

a signal processing portion operable to combine the first input signal and the second input signal into a combined signal;

an output portion disposed to receive the combined signal from said signal processing portion and operable to output an output signal based on the combined signal; and a plurality of radiating elements, each of which is operable to receive the output signal and to emit a signal corresponding to a combination of the first input signal and the second input signal.

5. The radar antenna system device of claim 4, wherein said signal processing portion comprises a transformation portion operable to transform the combined signal and to provide the transformed combined signal to said output portion.

6. The radar antenna system of claim 5, wherein said transformation portion is operable to transform the combined signal using a Chirex outphasing principle.

* * * * *